United States Patent
Li et al.

(10) Patent No.: US 7,170,982 B2
(45) Date of Patent: Jan. 30, 2007

(54) CALL AUTHORIZATION AND BILLING MESSAGE ROUTING CAPABILITY

(75) Inventors: Xiang Yang Li, Beijing (CN); Min Liu, Beijing (CN); John B. Reid, Naperville, IL (US); Guy H. Starner, Sugar Grove, IL (US); Ashish Trivedi, Naperville, IL (US); Peng Wang, Beijing (CN); Yile Enoch Wang, Freehold, NJ (US); Jun Zheng Yang, Beijing (CN); Lei Zhang, Beijing (CN); Jay Z. Zhao, Beijing (CN)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/926,503

(22) Filed: Aug. 26, 2004

(65) Prior Publication Data
US 2006/0045249 A1    Mar. 2, 2006

(51) Int. Cl.
*H04M 15/00* (2006.01)
(52) U.S. Cl. .............. 379/126; 379/114.03; 379/114.28
(58) Field of Classification Search .............. 379/126, 379/114.03, 114.28
See application file for complete search history.

(56) References Cited

U.S. PATENT DOCUMENTS

| | | | | |
|---|---|---|---|---|
| 6,298,383 | B1 * | 10/2001 | Gutman et al. | 709/229 |
| 2003/0217285 | A1 * | 11/2003 | Herrero et al. | 713/200 |
| 2003/0233444 | A1 * | 12/2003 | Bakita et al. | 709/224 |
| 2005/0086541 | A1 * | 4/2005 | Rajaniemi | 713/202 |
| 2005/0088971 | A1 * | 4/2005 | Qing et al. | 370/230 |

OTHER PUBLICATIONS

P. Calhoun et a.: Diameter Base Protocol; Network Working Group Request for Comments; 3588 Category; Standards Track (Internet Standards pp. 1-147. Sep. 2003.

* cited by examiner

*Primary Examiner*—Barry Taylor

(57) ABSTRACT

A method and apparatus for routing billing request and response messages to a billing server for serving calls by a particular subscriber. When the subscriber originates a call, an original billing request message is transmitted to an agent server. The agent server determines which billing server serves that subscriber and forwards the billing message to the selected billing server. The billing server responds to the request message with billing request data. Advantageously, this arrangement minimizes the problems of updating a large number of subscriber identification/billing server identification databases.

6 Claims, 3 Drawing Sheets

CALL AUTHORIZATION AND BILLING MESSAGE ROUTING CAPABILITY

RELATED APPLICATION

This application is related to an application of Yigang Cai, Qing Hong He, Min Liu, John B. Reid, Ashish Trevidi, Yile Enoch Wang, and Jay Z. Zhao entitled "Pre-Biller Capability In Enhanced Charging Collection Function (CCF) Applications", which application is assigned to the assignee of the present application and is being filed concurrently herewith.

TECHNICAL FIELD

This invention relates to methods and apparatus for routing telecommunications authorization, billing, and charging inquiries and responses in a telecommunications network.

BACKGROUND OF THE INVENTION

After many years of experience in postpaid charging of telecommunications calls, telecommunications service providers and their customers are becoming increasingly interested in real time charging which offers cost control and immediate balance update.

In response to these demands, the new generation of telecommunications systems such as those specified by 3GPP (3rd Generation Partnership Project) and 3GPP2 (3rd Generation Partnership Project 2) have introduced new and highly flexible billing arrangements. These billing arrangements are described in a standards document as Diameter billing arrangements.

In accordance with these Diameter billing arrangements, call authorization and billing services are provided by a group of Diameter servers, which store a customer profile and maintain billing records and account data for their served customers. These servers are accessed (optionally via a Diameter agent), and respond to billing inquiries from calls originated in a network by providing information to the Diameter client process controlling the billing aspects of a call. Because of a need to have a high degree of flexibility in the assignment of identifications of customers and because of the very large volume of billing inquiries and responses, it is necessary to provide a large number of Diameter servers in a network and to provide essentially complete flexibility in the assignment of subscribers to individual Diameter servers.

In accordance with one Diameter billing arrangement, the Diameter client comprises a database for storing the identity of the Diameter Server for serving each subscriber of the network. This arrangement creates problems for keeping all Diameter client databases up to date and in synchronism, and requires a large database in each Diameter client. For both of these reasons, if the number of subscribers served by a Diameter system is large, this arrangement is undesirable.

Accordingly, a problem of the prior art is that there is no efficient system for determining the identity of the Diameter server of a particular customer without incurring a penalty in call setup time of a telecommunications call.

SUMMARY OF THE INVENTION

The above problem is alleviated and an advance is made over the teachings of the prior art in accordance with this invention wherein a billing agent for routing billing inquiry messages to the appropriate Diameter server further contains a database for determining the identity of the billing server given only the identity of the subscriber making a call for which a billing inquiry message has been received. Advantageously, such a billing agent which may serve a plurality of billing clients, and can directly process and forward messages without requiring that the messages contain the identity of the Diameter server serving the customer who has originated a call for which a billing inquiry message has been received. The identity of the Diameter server is returned with a billing request response message, so that the billing agent need not determine the identity of the Diameter server in subsequent billing inquiry billing or action messages.

Advantageously, compared with storing a database for identifying the Diameter server for serving each subscriber in each Diameter client, the database is maintained only in the Diameter agent, thus sharply reducing the multiple copies of this database in the many Diameter clients of a network.

BRIEF DESCRIPTION OF THE DRAWING(S)

DETAILED DESCRIPTION

Figure 1:
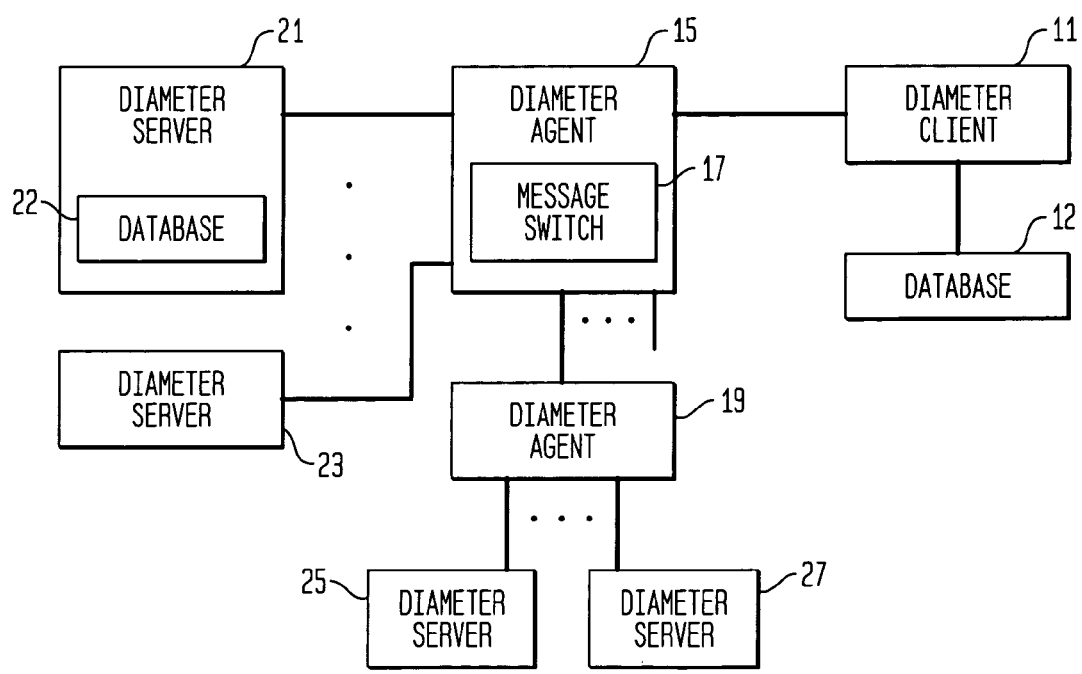
FIG. 1 is a block diagram of the prior art Diameter system configuration.

FIG. 1 is a block diagram illustrating the operation of an authorization, charging and billing system, the Diameter system in accordance with the prior art. Billing and charging functions are initiated from a Diameter client, a software process including data storage for generating Diameter billing request messages and receiving Diameter responses. These responses can influence the action of a telecommunications switch (not shown) associated with the Diameter client, to request establishment of calls and to request disconnect of calls. When the Diameter client 11 receives an initial message representing an originating telecommunications call, the Diameter client queries a subscriber database 12 to determine which of a plurality of Diameter servers 21, . . . , 23; . . . ; 25, . . . , 27 can serve the subscriber originating the telecommunications call. When the Diameter client receives the identification of the Diameter server from the database 12, the Diameter client sends a message including the identity of the Diameter server for the subscriber and call to an intermediate Diameter agent 15 which includes a message switch 17 for transmitting the request message to the proper Diameter server. This may be one of the Diameter servers 21, . . . , 23 directly connected to the Diameter agent or the message may be directed to another intermediate Diameter agent 19 for transmission to one of the Diameter servers 25, . . . , 27. The important point to remember is that the Diameter client receives the identification of the Diameter server for this call from the local subscriber database 12. The Diameter server comprises a database 22 for storing subscriber profiles and billing and account data.

Figure 2:
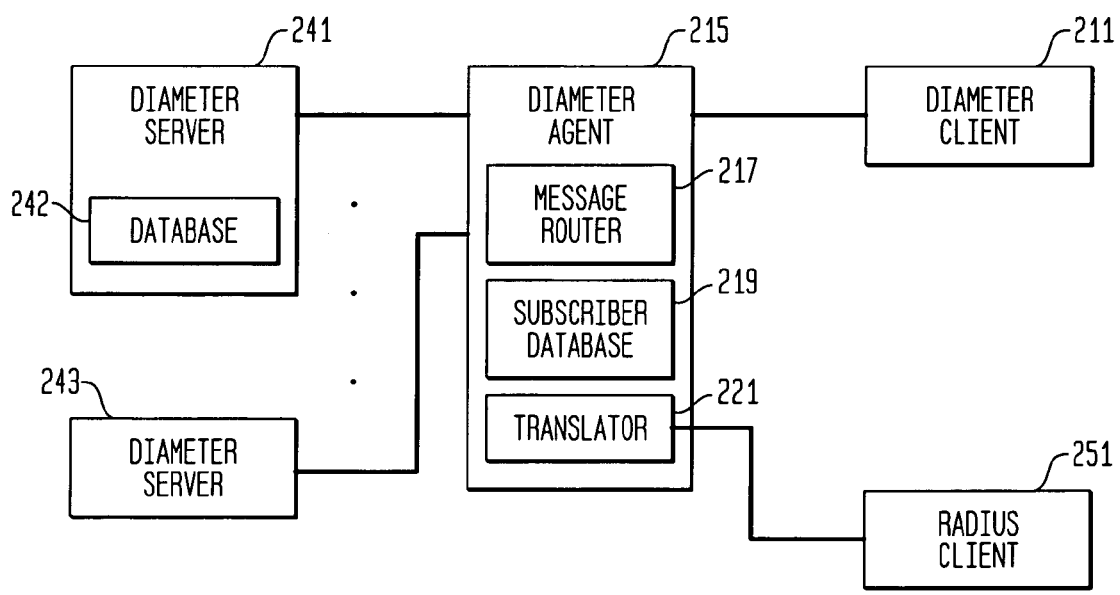
FIG. 2 is a block diagram illustrating the Diameter system configuration in accordance with Applicants' invention.

FIG. 2 is a block diagram illustrating the operation of the Diameter system in accordance with Applicants' invention. A change within the Diameter client is noted by having a different designation number (211) for this client. In accordance with Applicants' invention, the Diameter client sends an initial message which does not contain the identity of the Diameter server for this call to an enhanced Diameter agent 215. The enhanced Diameter agent still includes a message router 217 but in addition contains a database 219 to identify the Diameter server for a subscriber given the subscriber identification received in the original Diameter request message. The Diameter agent database 219 contains the required information, and the message, including this information is sent to the selected Diameter server, one of the group 241, . . . , 243. For subsequent Diameter messages, the identity of the Diameter server serving this call is included in the message so that the database 219 need not be repeatedly accessed for this call. Each Diameter server comprises a subscriber profile database such as database 242.

The connection between the Diameter client and the Diameter agent and between the Diameter agent and the Diameter server is shown as a direct connection but it can also be a connection established through a data network such as the Internet.

In the Diameter system, messages include a header comprising a command code to identify the purpose of the message, an Attribute/Value pair (AVP) to identify a subscriber, and, if known, a Destination-Host indicator to identify the Diameter server. An original message from the Diameter client would not contain the Destination-Host attribute value pair; the Diameter agent uses the database of the Diameter agent to determine this value from the value of the subscriber number, and routes the message to the Diameter server identified by the Destination-Host indicator.

The response to the original billing request message includes an authorization to establish the call, or a denial of that authorization. Subsequent exchanges between the Diameter client and Diameter server include further authorization or denial indicators.

Figure 3:
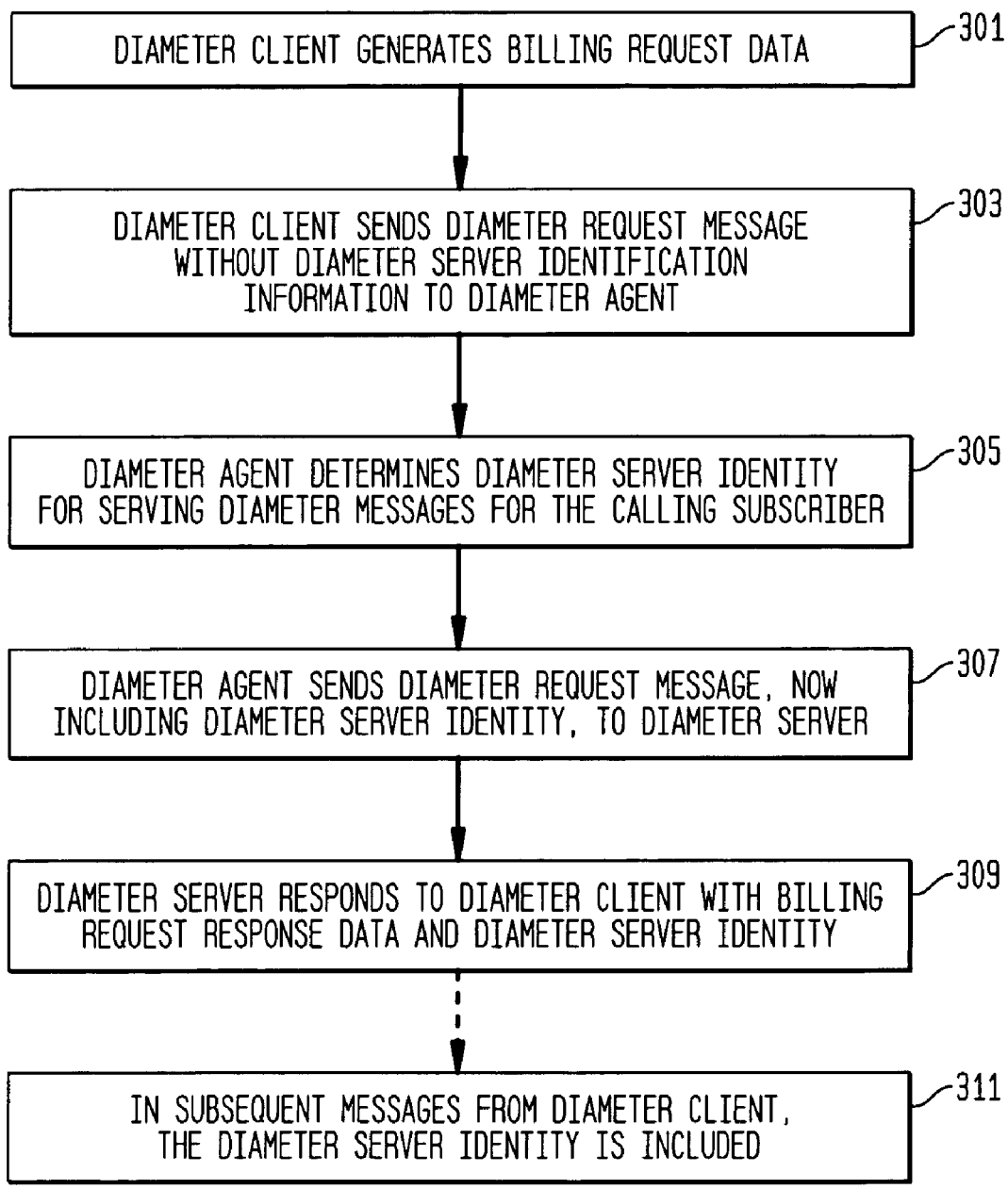
FIG. 3 is a flow diagram illustrating Diameter message exchanges in accordance with Applicants' invention.

FIG. 3 is a flow diagram illustrating the operation of Applicants' invention. The Diameter client generates billing request data when a call originates (action block 301). The Diameter client sends a Diameter request message which does not include the Diameter server identification to the Diameter agent (action block 303). The Diameter agent determines the identity of the Diameter server serving the caller (action block 305). The Diameter agent sends the Diameter request message now including the Diameter server identity to the Diameter server (action block 307). The Diameter server responds to the Diameter client with a message providing the billing request response data and the Diameter server identity (action block 309).

For subsequent messages between the Diameter client and the Diameter server, the Diameter server identity is included in the Destination-Host AVP (action block 311); this identity was reported to the Diameter client in action block 309.

The arrangement described in accordance with Applicants' invention is especially useful for calls requiring real time billing such as calls billed against a prepaid account. However, the arrangement can also be used for billing calls which do not require real time billing in which case the Diameter server performs the conventional postpaid billing function.

While the above preferred embodiment is for 3rd generation telecommunications systems it can also be retrofitted to earlier telecommunications systems; in that case the Diameter server would be a process in a control processor of a switching system.

In accordance with Applicants' invention, the Diameter agent can be further enhanced by a translator 221 to translate between messages of the Diameter system in a first dialect and messages of, for example, the Radius system, in a second dialect. With this arrangement, the Diameter agent and the Diameter servers can also serve subscribers served by the prior art Radius billing and charging system. The Diameter agent 215 receives messages from and to Radius client 251, and translates these messages into Diameter messages using translator 221. Thus, a system in accordance with Applicants' invention can also handle legacy equipment using, for example, the Radius system, and not arranged to query a Diameter server.

In this description, it is assumed that the identity of the Diameter server, received in an initial response message, is retained by the Diameter client. This arrangement has the disadvantage that if the identity of the Diameter server changes during a call, the message will be incorrectly routed. It appears that this condition is unlikely, but to protect against it, in an alternate embodiment, the Diameter client does not specify the identity of the Diameter server in subsequent messages to the Diameter agent. If the Diameter agent database includes a cache memory, then subsequent requests to identify the Diameter server can be handled expeditiously.

The above description is of one preferred embodiment of Applicants' invention. Other embodiments will be apparent to those of ordinary skill in the art without departing from the scope of the invention. The invention is limited only by the attached claims.

We claim:

1. In a telecommunications network, a method of controlling the billing of calls comprising the steps of:
   receiving an originating request for establishment of a telecommunications call in a billing client;
   transmitting a message, including an identification of a caller of said call, in a first dialect, from said billing client to a common agent server;
   in said agent server, determining an identity of a billing server for authorizing and billing said call;
   responsive to said determining, transmitting a billing request message, including an identity of said billing server, to said billing server;
   responsive to receiving said billing request message, generating a response message in said first dialect in said billing server; and
   transmitting said response message to said billing client.

2. The method of claim 1 further comprising the step of:
   transmitting subsequent billing request messages for said call to said billing server without requiring a repetition of said determining step.

3. The method of claim 1 further comprising the steps of:
   transmitting another message in a second dialect to said billing agent; and
   in said billing agent, translating said another message in said second dialect into a corresponding message in said first dialect for transmission to said billing server, and
   translating another response message in said first dialect from said billing server to a corresponding response message in said second dialect for transmission to a source of said another message.

4. In a telecommunications network, apparatus for controlling the billing of calls comprising:
   means for receiving an originating request for establishment of a telecommunications call;
   means for transmitting a message, including an identification of a caller of said call, in a first dialect from said means for receiving to a common agent server;
   in said agent server, means for determining an identity of a billing server for authorizing and billing said call;

means, responsive to said determining, for transmitting a billing request message, including an identity of said billing server, to said billing server;

means, responsive to receiving said billing request message, for generating a response message in said first dialect in said billing server; and means for transmitting said response message to said means for receiving.

5. The apparatus of claim 4 further comprising:

means for transmitting subsequent billing request messages for said call to said means for receiving without requiring a repetition of said determining step.

6. The apparatus of claim 4 further comprising:

means for transmitting another message in a second dialect to said billing server; and in said billing agent, means for translating said another message in said second dialect into a corresponding message in said first dialect for transmission to said billing server; and means for translating another response message in said first dialect from said billing server to a corresponding response message in said second dialect for transmission to a source of said another message.

* * * * *